UNITED STATES PATENT OFFICE.

EMIL ENDERS, OF BRESLAU, GERMANY.

PROCESS OF TREATING POTATOES.

1,090,782.  Specification of Letters Patent. Patented Mar. 17, 1914.

No Drawing.  Application filed August 19, 1913. Serial No. 785,472.

*To all whom it may concern:*

Be it known that I, EMIL ENDERS, a subject of the German Emperor, and residing at Ohlau Ufer 38, Breslau, Germany, have invented certain new and useful Improvements in New or Improved Processes for Treating Potatoes, of which the following is a specification.

It has been proposed to dry potatoes for edible purposes for human beings and animals. With this object according to the known process the potatoes are cut up into strips or slices or mashed, then parboiled or steamed, and finally dried on grates at a high temperature. By this treatment a permanent product is obtained which can be kept for several years. When these dried potatoes are put into cold water and placed on a fire or otherwise heated they swell up and after being boiled for about half an hour are then eatable. In this drying process about from 70 to 75 (seventy to seventy five) per cent. of the water contained in the potatoes is evaporated. As about from 5 to 6 (five to six) per cent. must be allowed for the skins this method of treatment yields about from 20 to 25 (twenty to twenty five) per cent. of dry potatoes, without resulting in valuable by-products. Potatoes are also extensively used in the alcohol industry. In order to obtain potato spirit, the potatoes are boiled to facilitate the breaking up of the cell walls, and then crushed for the purpose of completely breaking up the cells and extracting all the starch from the potatoes. In such process all or substantially all the nutritive elements of the potatoes are extracted and then converted into potato spirit, and no valuable by-products are obtained.

I have discovered that by a proper treatment of the potatoes, it is possible to obtain, besides a considerable amount of potato spirit, a valuable nutritive and palatable dried potato which is superior in quality to the dried potato obtained by the old process above described. By extracting by application of pressure from the cut up raw potatoes, without crushing the same, only a part of the juice for the purpose of manufacturing potato spirit the remaining pressed potatoes retain a sufficient amount of starch, albumin and other nutritive elements to form, when dried, a valuable article of food.

My invention is of especial importance for and can be advantageously applied in potato spirit factories. These factories are equipped to convert into alcohol a certain amount of potatoes only, and if, in a year yielding more than the average potato crop, the factory can profitably buy a larger amount of potatoes, it was heretofore impossible profitably to make use of the excess amount. This is different when, according to my invention, the potatoes are used not only for the manufacture of alcohol, but also for the manufacture of preserved potatoes. It is obvious that the amount of juice to be extracted from the raw potatoes can be varied so as to make the operation of the factory as profitable as possible. Only so much juice will be extracted as is sufficient to yield the maximum amount of alcohol that can be conveniently handled by the factory. Thus, for instance, if a factory is equipped to handle the total potato spirit output of 1,000 tons of potatoes, and in a year with an exceptionally large potato crop 2,000 tons of potatoes are available for the treatment by the said factory, only about one-half of the entire juice will be extracted from the raw potatoes and converted into alcohol, while the pressed potatoes may be converted, according to the present invention, into a palatable dried potato which will last for years, which can be conveniently stored and which can be advantageously used, for instance, for long expeditions, in time of war, etc.

The process according to my present invention consists in cutting up the raw potatoes into strips, slices or flakes, or mashing them, and then withdrawing the juice therefrom from which latter, alcohol, bitter principles, albuminoid substances, and other substances contained in the juice of the cells, are obtained, while the expressed potatoes are dried alone in order to serve for human food or as cattle food. The juice is obtained as by pressing the potatoes or in any other appropriate manner.

By means of this process it is possible to obtain on the one hand dried potatoes the taste of which is improved because the vegetable bitters and similar substances contained in the juice of the cells are removed therefrom, and on the other hand alcohol and a liquid food for cattle (schlempe), in a rational manner as by-products, whereas the treatment of potatoes for the latter products as the principal products alone is expensive.

The process is carried out in the following manner: The raw potatoes are first peeled and then cut up into strips or slices, or mashed into pulp. The potatoes are only peeled prior to being further treated when the subsequent dried potatoes are to serve as edible potatoes for human use. If on the contrary they are to be used as cattle food peeling is not necessary. The potatoes so cut up have water added to them in slight quantity if necessary. All or a part of the juice is then extracted from the potatoes by pressure either at the ordinary temperature, or at a raised temperature. The potatoes from which the juice has been expressed are then parboiled in what remains of their own juice with the addition of some water and afterward dried at a high temperature whereby a product which keeps admirably is obtained. The juice obtained and which contains starch is then converted into sugar, fermented and distilled whereby alcohol and a liquid food for cattle are obtained. The drying of the potatoes from which the juice has been extracted is carried out on drums or grates.

What I claim is:

1. A process of treating potatoes which comprises comminuting raw potatoes, expressing juice therefrom by pressing the same, then boiling the potato substance from which the juice has been expressed, then drying the residue.

2. The process of treating potatoes which comprises peeling the potatoes, cutting up the potatoes, expressing the juice from said cut up potatoes while in an uncooked condition, then boiling the potatoes from which the juice has been removed, and then drying the material.

In testimony whereof I affix my signature in presence of two witnesses.

EMIL ENDERS.

Witnesses:
Louis A. Katz,
Ernst Stinrf.